United States Patent
Smithers et al.

[15] 3,634,902
[45] Jan. 18, 1972

[54] WINDSCREEN WIPER BLADES

[72] Inventors: Philip G. K. Smithers, Osterley; Peter Mower, Whitton, Twickenham, both of England

[73] Assignee: Trico-Folberth Limited, Brentford, England

[22] Filed: June 4, 1970

[21] Appl. No.: 43,454

[30] Foreign Application Priority Data

June 10, 1969 Great Britain......................29,296/69

[52] U.S. Cl. ....................................................15/250.42
[51] Int. Cl. ..........................................B60s 1/40, A471 1/02
[58] Field of Search .........15/250.16, 250.17, 250.2, 250.32, 15/250.33, 250.35, 250.36, 250.4, 250.41, 250.42

[56] References Cited

UNITED STATES PATENTS

| | | | |
|---|---|---|---|
| 2,852,796 | 9/1958 | Leins | 15/250.36 X |
| 2,973,542 | 3/1961 | Horton | 15/250.35 X |
| 3,163,877 | 1/1965 | Wubbe | 15/250.32 |
| 3,378,874 | 4/1968 | Scinta | 15/250.42 X |

*Primary Examiner*—Peter Feldman
*Attorney*—E. H. Liss

[57] ABSTRACT

A wiper blade assembly includes a pressure distributing superstructure consisting of articulated levers, an arm attaching clip pivotally secured centrally of the blade to the uppermost levers and a wiping unit. The wiping unit includes an elongate flexible backing strip supporting a rubber or rubberlike wiping element. The wiping unit is offset laterally from the superstructure and inwardly toward the windshield and is secured to the superstructure by laterally extending connecting arms which also serve to distribute the applied arm pressure to longitudinally spaced points along the length of the wiper unit.

5 Claims, 5 Drawing Figures

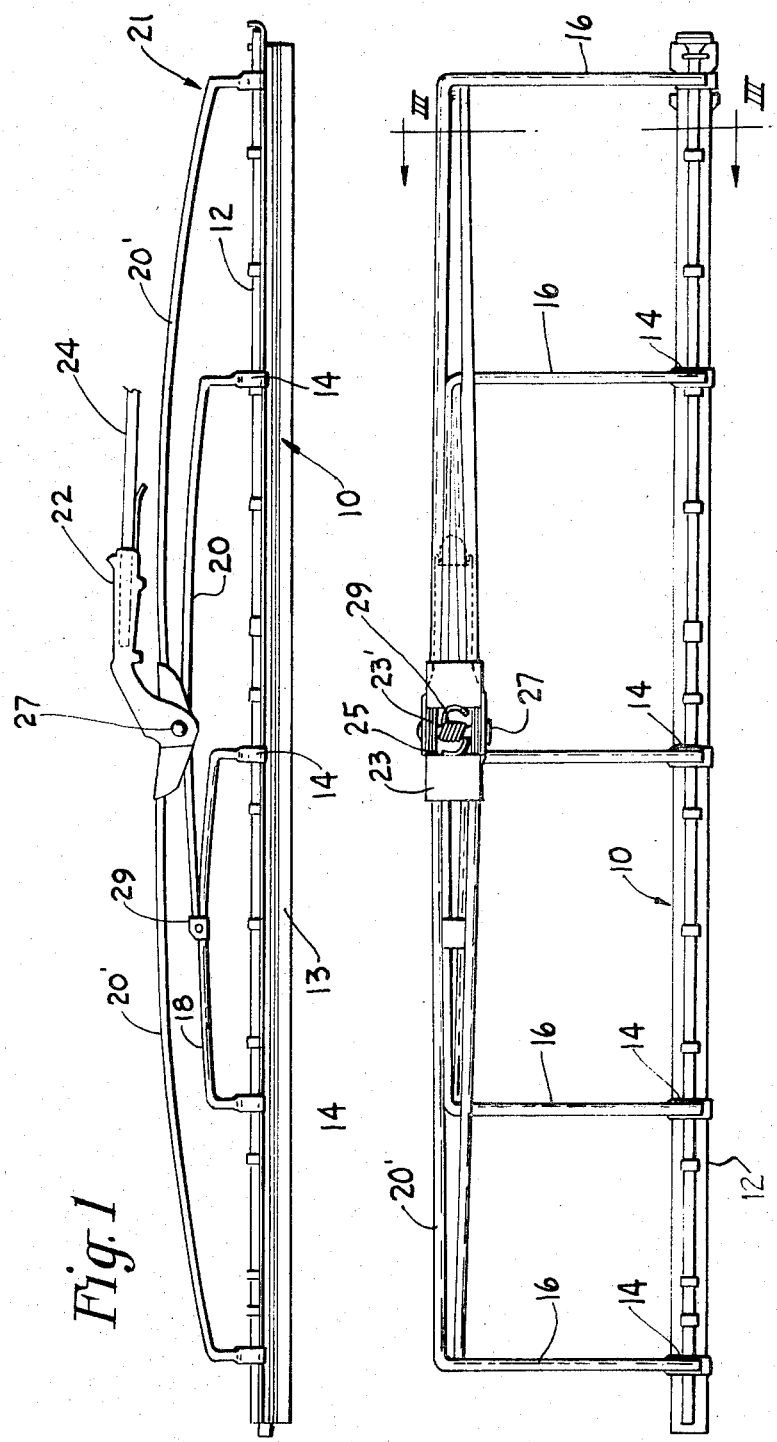

3,634,902

WINDSCREEN WIPER BLADES

BACKGROUND OF THE INVENTION

The invention relates to articulated wiper blades assemblies for wiping curved windshields and more particularly to an antiwindlift-type wiper blade assembly.

The forward motion of the vehicle in combination with any wind causes a strong airflow over the surface of a windshield and the pressure of the wiping element causes a local deflection of flow away from the windshield. If this deflected flow impinges on the superstructure of the assembly there is a tendency for the entire wiper blade unit to lift off the windshield at high vehicle speeds. Arrangements which are designed to reduce windlift include the use of very low profile blades in which case the superstructure is very close to the backing strip. This renders it difficult to retain enough flexibility needed for use on curved windshields. On the other hand, antiwindlift arrangements have been designed wherein the superstructure is spaced a considerable distance from the windshield. This produces a large twisting moment on the arm caused by the frictional drag of the blade on the windshield.

SUMMARY OF THE INVENTION

According to the present invention the pressure-distributing superstructure is laterally offset from the wiper unit comprising the rubber element and the backing strip by a substantial distance in a direction perpendicular to the plane in which relative movements of the superstructure parts occur and is connected to points spaced along the backing strip. With this arrangement the superstructure is wholly or largely clear of airflow disturbances generated by the wiper element. Offsetting of the superstructure from the wiping unit reduces the tendency of the blade to lift off the windshield. This is true whether the offset is toward the center of the vehicle or toward the adjacent side of the vehicle.

In arrangements according to this invention the connections from the superstructure to the backing strip are preferably by arms which are thin and as straight as possible and which are rigidly attached to respective parts of the superstructure. The superstructure parts may be formed from pairs of rods in which case the connecting arms are made by bending one rod through a right angle and brazing it to the other rod. However, in accordance with the broader aspects of the invention, the superstructure parts may be of other forms and particularly of stamped sheet metal.

The principal object of the present invention is to provide an improved articulated windshield wiper blade which is effective to preclude windlift and is of simple and economic construction.

Another object of the invention is to provide an improved articulated windshield wiper blade assembly which presents the blade in the proper attitude toward the windshield when loaded by arm pressure.

A further object of the invention is to provide an improved articulated antiwindlift windshield wiper blade assembly on which the arm pressure may be relieved in the park position to avoid setting of the rubber element.

Other objects and advantages of the invention will be apparent from the following detailed description taken in connection with the accompanying drawings.

DESCRIPTION OF THE DRAWING

FIG. 1 is a side elevation of the windshield wiper blade assembly of this invention;

FIG. 2 is a top elevational view of the wiper blade assembly of this invention;

Figure 5:
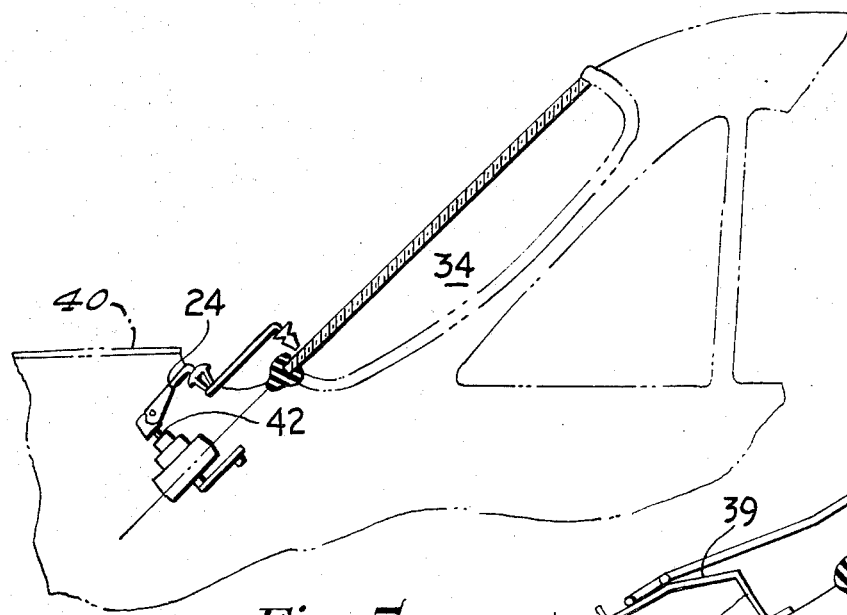
FIG. 5 is a fragmentary view of a motor vehicle incorporating the wiper blade assembly.

A wiper blade assembly comprises a wiper unit 10 including a flexible metal backing strip 12 supporting a rubber or rubberlike wiping element 13 within a central slot thereof. The wiper unit is in turn supported at a plurality of points along its length by claws 14. Connecting arms 16 extend from the claws 14 to respective lever elements.

The lever elements comprise a yoke 18 and levers 20 and 20' pivotally connected together to form an articulated pressure-distributing superstructure 21. In the embodiment shown, each of the levers 20' are formed of a pair of rigid wire rods brazed together at one end with a connecting arm 16 formed from one of the wire rods and extending laterally. The rods diverge toward the other end and are brazed to a lug 23 of sheet material to form a tapered lever. The lug 23 includes ears 23'. The ears 23' of the adjacent lugs 23 of levers 20' overlap. Upwardly extending ears 25 may be secured intermediate the ends of lever 20 and lie adjacent the overlapping ears 23'. An arm attaching clip 22 is provided having ears which overlie the overlapping ears 23' and 25. A rivet 27 extends through aligned apertures in the ears 23', 25 and the ears of the clip 22 to thereby provide a pivotal connection between the levers 20', 20 and arm clip 22. A torsion spring 29 received on rivet 27 has its ends bearing against the upper surface of lugs 23 to urge the levers 20' downwardly against the backing strip 12. Lever 20 in the illustrated embodiment is also formed of a pair of rigid wire rods brazed together to form a tapered lever. One of the rods extends laterally at one end to form a connecting arm 16. The wide end of lever 20 partially overlies yoke 18 and is pivotally connected thereto as at 29 intermediate the ends of the yoke 18. Likewise the yoke 18 is formed of a pair of rigid wire rods which may be brazed together, one of the rods extends laterally at each end to form connecting arms 16.

The wiper arm 24 connects through clip 22 to the wiper blade assembly. At its other end arm 24 is mounted on a rockshaft of a vehicle for oscillation therewith to effect oscillatory movement of the wiper assembly in an arcuate path across the windshield. The yoke 18 and levers 20 and 20' are pivotally connected so that they can move relative to one another in a plane which is parallel to the plane of FIG. 1. The planes passing through the wiper unit 10 and through the superstructure 21 along its longitudinal axis embracing the vertical axes lie slightly convergent to each other as indicated by the lines 26 and 36 in FIG. 3.

Figure 3:
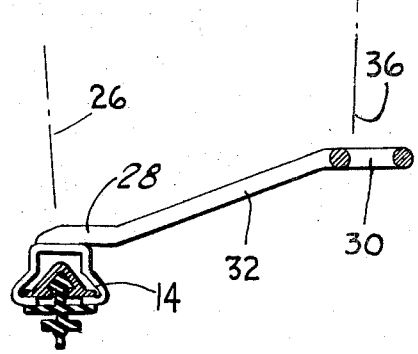
FIG. 3 is a sectional view taken on line III—III of FIG. 2.

An important aspect of this invention is that the connecting arms 16 extend laterally from the superstructure 21. They extend a substantial distance in a direction which is substantially perpendicular to the plane indicated by the lines 26 and 36. This causes the wiper element 10 to lie offset laterally from the superstructure 21. As seen in FIG. 3, the particular connecting arm 16 has the shape of a flattened "Z," having one end 28 connected rigidly with the claws 14, the other end 30 rigidly associated with the yoke 18 and an intermediate portion 32 which is inclined at somewhat less than 90° to the blade 36. The direction of inclination is such that the yoke 18 is spaced further from the windshield 34 than are the claws 14.

In use, pressure is transmitted from the spring-loaded wiper arm 24 to the wiper element 10, to press the element against a windshield 34. The pressure is transmitted from the superstructure to the element 10 through the connecting arms 16 which lie substantially perpendicular to the direction of the pressure. A clockwise bending moment, referring to FIG. 3, is therefore exerted on the element 10 and the moment causes two separate problems.

Firstly, the element 10 with the backing strip 12 and the claws 14 are caused to tilt in a clockwise sense (FIG. 3). If the element 10 does not lie perpendicular to the windshield during a wiping action, the wiping action is more efficient in the one direction of movement than in the other. This is overcome in this construction by having the plane 36 which passes through the element 10, to lie obliquely to the windshield when the wiper blade unit is in its unloaded condition. The unloaded condition is when the arm or superstructure is moved forwards, i.e., away from the windshield so that the element cannot press against the windshield. The angle and direction of the obliqueness is such that the planes 26 and 36 mutually converge, in the direction towards the windshield, and such that when the blade assembly is in use, i.e., in the loaded condition, the consequent bending moment of the element 10 causes the planes 26 and 36 to lie parallel.

Secondly if the element 10 where left in its loaded condition when the blade assembly is "parked" which is most of the time—the rubber element 10, because of the bending moment exerted on it, can develop a permanent set, meaning it would have a bent nonsymmetrical shape even when relaxed. This too, if it happens, can cause a nonuniform wiping action.

Figure 4:
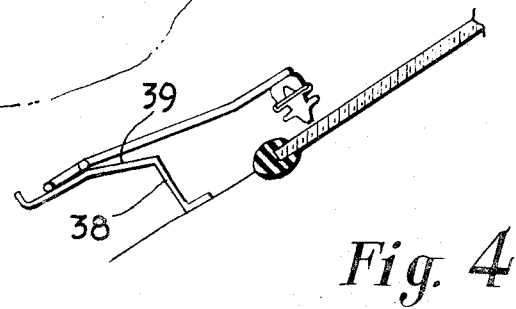
FIG. 4 is a diagrammatic view partly in cross section of a portion of a motor vehicle incorporating the blade assembly of this invention.

An arrangement for overcoming this difficulty is seen in FIG. 4, which shows a section taken transversely to the length of a superstructure, in the parked condition. A cam member 38 is positioned on the vehicle, its cam surface 39 being arranged so that when the arm 24 moves through the last few degrees towards its parked condition, the yokes 18 and levers 20 and 20 ride up the cam surface, causing the blade assembly to be lifted forwards from the windshield.

Preferably the direction of the offset of the superstructure 21 from the wiper blade unit 10 is in the direction which permits the superstructure to lie concealed behind a shroud on the vehicle while the element lies at the boundary of the windshield. This is illustrated in FIG. 5 in which the shroud is indicated by the numeral 40. It conceals the superstructure and the arm 24 which latter is mounted on the wiper shaft 42. Of course, the feature of the shroud and the feature of the cam 38 can be used separately or in combination.

The amount of the offset, measured from the plane 26 to the plane 36, is not critical and may be varied to suit different sizes and types of blades or to suit a particular windshield or a given set of operating conditions. For example, the amount of the offset may in some cases be of the order of 0.6 inch while in others it may be 3 inches or more.

It should now be apparent that a unique wiper blade assembly has been provided which will reduce windlift at high speeds and which is simple and economical to manufacture. A certain specific embodiment of the invention has been shown and described for the purpose of illustration, but it will be apparent that various modifications and other embodiments are possible within the scope of the invention. For example, the superstructure parts may be of other forms, in particular of bent sheet metal. Other arrangements of levers and yokes may be provided. It is, therefore, to be understood that the invention is not limited to the specific arrangement shown but in its broadest aspects it includes all equivalent embodiments and modifications which come within the scope of the invention.

What is claimed is:

1. A windshield wiper blade assembly for a motor vehicle having a windshield and means adjacent said windshield for mounting said wiper blade assembly for oscillatory movement in an arcuate path across the windshield comprising a wiper unit and an articulated pressure-distributing superstructure offset laterally from said wiper unit and connecting means for securing said superstructure to said wiper unit at a plurality of points spaced longitudinally along said wiper unit.

2. A windshield wiper blade assembly according to claim 1 wherein said connecting means comprise a plurality of arms extending from said superstructure and being rigidly secured to said wiper unit.

3. A windshield wiper blade assembly according to claim 1 wherein said wiper unit lies in a plane offset inwardly from the superstructure toward the windshield.

4. A windshield wiper blade assembly according to claim 3 wherein the vertical axes of said wiper unit and said superstructure are disposed in mutually converging planes when the wiper blade assembly is unloaded, said planes converging at an angle such that when the blade is in loaded condition the consequent bending moment causes the said vertical axes to lie in parallel planes.

5. A windshield wiper assembly according to claim 1 including cam means positioned adjacent the boundary of the windshield for urging the blade unit to move away from the surface of the windshield in parked position.

* * * * *